(12) United States Patent
Enyedy

(10) Patent No.: US 11,338,382 B2
(45) Date of Patent: May 24, 2022

(54) WELDING EQUIPMENT SECURITY

(71) Applicant: LINCOLN GLOBAL, INC., Santa Fe Springs, CA (US)

(72) Inventor: Edward A. Enyedy, Eastlake, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 573 days.

(21) Appl. No.: 16/277,111

(22) Filed: Feb. 15, 2019

(65) Prior Publication Data

US 2019/0308267 A1  Oct. 10, 2019

Related U.S. Application Data

(60) Provisional application No. 62/652,575, filed on Apr. 4, 2018.

(51) Int. Cl.
| | |
|---|---|
| *B23K 9/095* | (2006.01) |
| *B23K 9/10* | (2006.01) |
| *B23K 9/32* | (2006.01) |
| *B23K 37/00* | (2006.01) |
| *G07C 9/33* | (2020.01) |

(52) U.S. Cl.
CPC .......... *B23K 9/0953* (2013.01); *B23K 9/1006* (2013.01); *B23K 9/1062* (2013.01); *B23K 9/32* (2013.01); *B23K 9/321* (2013.01); *B23K 9/327* (2013.01); *B23K 37/006* (2013.01); *G07C 9/33* (2020.01)

(58) Field of Classification Search
CPC ...... B23K 9/1006; B23K 9/0953; B23K 9/32; B23K 9/321; B23K 37/006; B23K 9/1062; B23K 9/327; G07C 9/33
See application file for complete search history.

(56) References Cited

U.S. PATENT DOCUMENTS

| | | | | |
|---|---|---|---|---|
| 7,523,069 | B1 * | 4/2009 | Friedl | G07C 9/37 |
| | | | | 705/50 |
| 2011/0309053 | A1 | 12/2011 | Baus | |
| 2015/0129581 | A1 | 5/2015 | Cole | |
| 2017/0050256 | A1 * | 2/2017 | Enyedy | B23K 9/10 |
| 2017/0314561 | A1 | 11/2017 | Jochman | |
| 2017/0334012 | A1 | 11/2017 | Baus | |

FOREIGN PATENT DOCUMENTS

AT  004 229 U1  4/2001

OTHER PUBLICATIONS

Extended European Search Report from Corresponding Application No. 19167278.1; dated Sep. 11, 2019; pp. 1-8.

* cited by examiner

*Primary Examiner* — Brian W Jennison
(74) *Attorney, Agent, or Firm* — Tucker Ellis LLP; David J. Muzilla

(57) ABSTRACT

The subject innovation described herein generally pertains to a system and method for security features for a device in which functionality of the device can be limited or restricted in accordance with one or more security layers. To access functionality of the device, an appropriate security-related input is required.

15 Claims, 11 Drawing Sheets

WELDING EQUIPMENT SECURITY

CROSS-REFERENCE TO RELATED APPLICATIONS

This application is a non-provisional of and claims priority to U.S. Provisional Patent Application Ser. No. 62/652,575, filed Apr. 4, 2018. The entirety of the aforementioned application is incorporated herein by reference.

TECHNICAL FIELD

In general, the subject innovation relates to securing welding equipment and, in particular, to a technique for two-layer security to deter theft and to limit access to certain functionality.

BACKGROUND

Welding may often be required on a site where access to grid power is limited. Accordingly, welding equipment may be relatively portable and incorporate engine driven generators to provide power to a welder, a cutter, or other power tools on site. Such equipment is valuable and, thus, theft is a concern. As welding equipment becomes smaller and lighter with improvements, it also becomes more of a target. Physically securing the welding equipment may deter some theft, but such security measures may often be defeated.

Other security considerations related to welding equipment pertain to securing access to particular functionality. For instance, welding equipment may be frequently used by people having different roles. An operator is primarily interested in simply using the equipment for welding operations. A supervisor may desire to access and/or change set-up information and a service technician may wish to view diagnostic information. Accordingly, the operator may be restricted from accessing or changing set-up or diagnostic information so as to better control operations performed with the welding equipment.

SUMMARY

In various embodiments, welding equipment is configured with a two-layer, dual-purpose security mechanism. A first layer secures operation of the welding equipment. Accordingly, appropriate verification is entered to enable the welding equipment to be used by a welder, for example. A second layer of security restricts access to management functions. Verification at the second layer enables a supervisor to control the welding equipment.

In accordance with one aspect, a welding device is provided that includes a welding power supply configured to generate a welding output to an electrode to perform a welding operation. The welding device further includes a power source configured to provide power to the welding power supply for conversion into the welding output, an interface configured to receive a security-related input, and a controller. The controller is configured to verify the security-related input based on an associated request for access to a function and configured security levels of the welding device and selectively enable access to the function in accordance with a verification result.

In accordance with another aspect, a method for a welding device having at least two security levels is provided. A first security level is associated with a first set of functionality and a second security level is associated with a second set of functionality. The method includes receiving a request to access a function of the welding device, prompting for entry of security-related input, receiving a user input, determining whether the function requested corresponds to the first security level or the second security level, verifying the user input against a determined security level associated with the function requested, and enabling access to the function when the user input is valid for the determined security level.

In accordance with yet another aspect, a non-transitory, computer-readable storage medium is provided that stores computer executable instructions implementing security procedures for a welding device. The instructions, when executed, configure the processor to disable operation of the welding device pending entry and validation of security-related input, receive user input indicative of a function request and an access code, wherein the access code corresponds to at least one security level of one or more configured security levels of the welding device, verify the access code based on the at least one security level corresponding to the access code and an association of respective functions of the welding device to respective security levels, and enable operation of the welding device when the access code corresponds to a security level associated with the function requested.

These and other aspects of the subject innovation will be evident when viewed in light of the drawings, detailed description, and appended claims.

BRIEF DESCRIPTION OF THE DRAWINGS

The subject innovation may take physical form in certain parts and arrangements of parts, a preferred embodiment of which will be described in detail in the specification and illustrated in the accompanying drawings which form a part hereof, and wherein.

DETAILED DESCRIPTION

Figure 1:
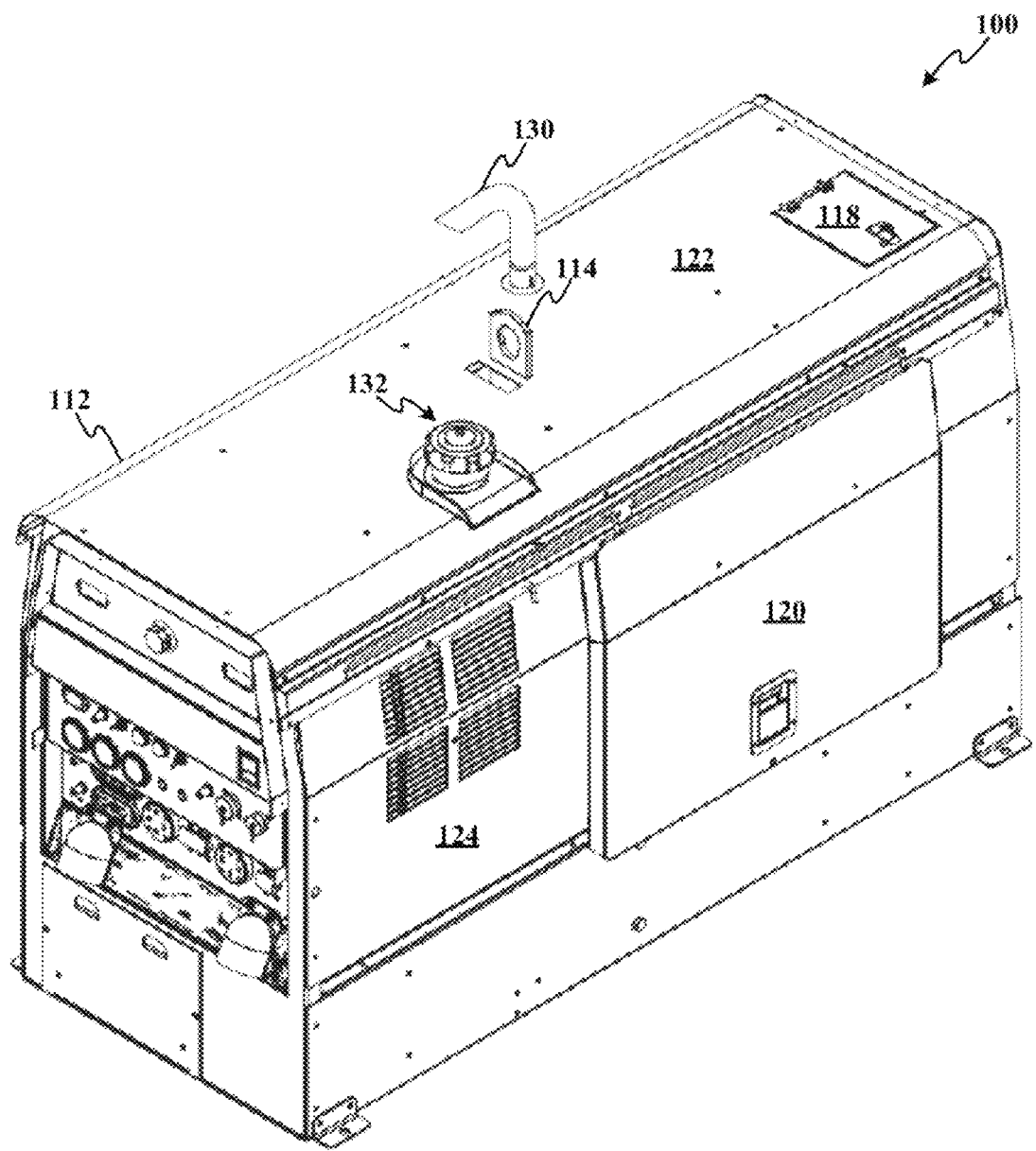
FIG. 1 illustrates an exemplary, non-limiting embodiment of welding equipment.

Embodiments of the subject innovation relate to methods and systems related to security features of welding equipment in which functionality of the welding equipment can be partitioned and restricted in accordance with one or more security levels. Each security level may have an input related therewith that is required to access the corresponding functionality. For example, a first security level may restrict use of the welding equipment such that entry of an appropriate access code associated with the first security level is required by an operator before using the welding equipment. A second security level may be associated with configuration, supervisory, maintenance, and/or diagnostic functions of the welding equipment. Entry of an access code for the second security level is required to access those functions.

The one or more security levels may be hierarchically arranged. For instance, the second security level may be higher (e.g. provide a greater amount of access) than the first security level. In addition, granting access to the second security level (e.g. via entry of the appropriate input) also grants access to the functionality of the first security level.

The welding equipment may include power source that provides electrical power. The power source may be a portable source such as an engine-driven generator and/or a battery system. The electrical power from the power source may be conditioned, modified, or transformed by a welding power supply to generate a welding output utilized for a welding operation. The welding equipment may further include a user interface (e.g. a display, buttons, knobs, dials, touchscreens, etc.) and various communications or peripheral interfaces to interact with other devices.

In one embodiment, a controller of the welding equipment may disable the power source and/or the welding power supply in accordance with the first security level. Thus, to turn on the welding equipment, entry of an appropriate access code is required. This reduces a perceived value of the equipment to thieves since the equipment is inoperable without the access code. Supervisory, configuration, and maintenance functions of the welding equipment may be restricted in accordance with the second security level. To access these functions, a second access code (e.g. a supervisor code) is required. Thus, an operator may use the welding equipment to perform welding operations, but is restricted from higher level functions so that a supervisor or other person can maintain ultimate control of the welding equipment. Accordingly, one security layer or level may have, primarily, an anti-theft purpose. Another security level may have a primary purpose of restricted access to administrative and diagnostic functions to discourage operator misuse.

In a further example, the welding equipment may remain operable for a configured duration of time following entry of an appropriate code by the operator. Within this duration of time, the operator will not need to reentry the code each time the equipment is started. When the period of time elapses, the welding equipment may be disabled and re-entry of the code may be required.

Various embodiments will now be described with reference to the drawings, wherein like reference numerals are used to refer to like elements throughout. In the following description, for purposes of explanation, numerous specific details are set forth in order to provide a thorough understanding of the embodiments. It may be evident, however, that features described herein can be practiced without these specific details. Additionally, other embodiments are possible and the features described herein are capable of being practiced and carried out in ways other than as described. The terminology and phraseology used herein is employed for the purpose of promoting an understanding of the invention and should not be taken as limiting.

FIGS. 1-4 illustrate various embodiments of exemplary welding equipment that may be utilized in connection with the security techniques described herein. These examples are not limiting on the types of equipment that may benefit or implement multi-layer, dual purpose security.

FIG. 1 illustrates a welding device 100. The welding device 100 includes a housing 112 which encloses the internal components of the welding device. Optionally, the welding type device 100 includes a loading eyehook 114 and/or fork recesses. The loading eyehook 114 and the fork recesses facilitate the portability of the welding device 100. Optionally, the welding-type device 100 could include a handle and/or wheels as a means of device mobility. The housing 112 also includes a plurality of access panels 118, 120. Access panel 118 provides access to a top panel 122 of housing 112 while access panel 120 provides access to a side panel 124 of housing 112. A similar access panel is available on an opposite side. These access panels 118, 120, provide access to the internal components of the welding device 100 including, for example, an energy storage device suitable for providing welding-type power. An end panel includes a louvered opening to allow for air flow through the housing 112.

The housing 112 of the welding-type device 100 also houses an internal combustion engine or a motor. The engine is evidenced by an exhaust port 130 and a fuel port 132 that protrude through the housing 112. The exhaust port 130 extends above the top panel 122 of the housing 112 and directs exhaust emissions away from the welding-type device 100. The fuel port 132 preferably does not extend beyond the top panel 122 or side panel 124. Such a construction protects the fuel port 132 from damage during transportation and operation of the welding-type device 100.

Figure 2:
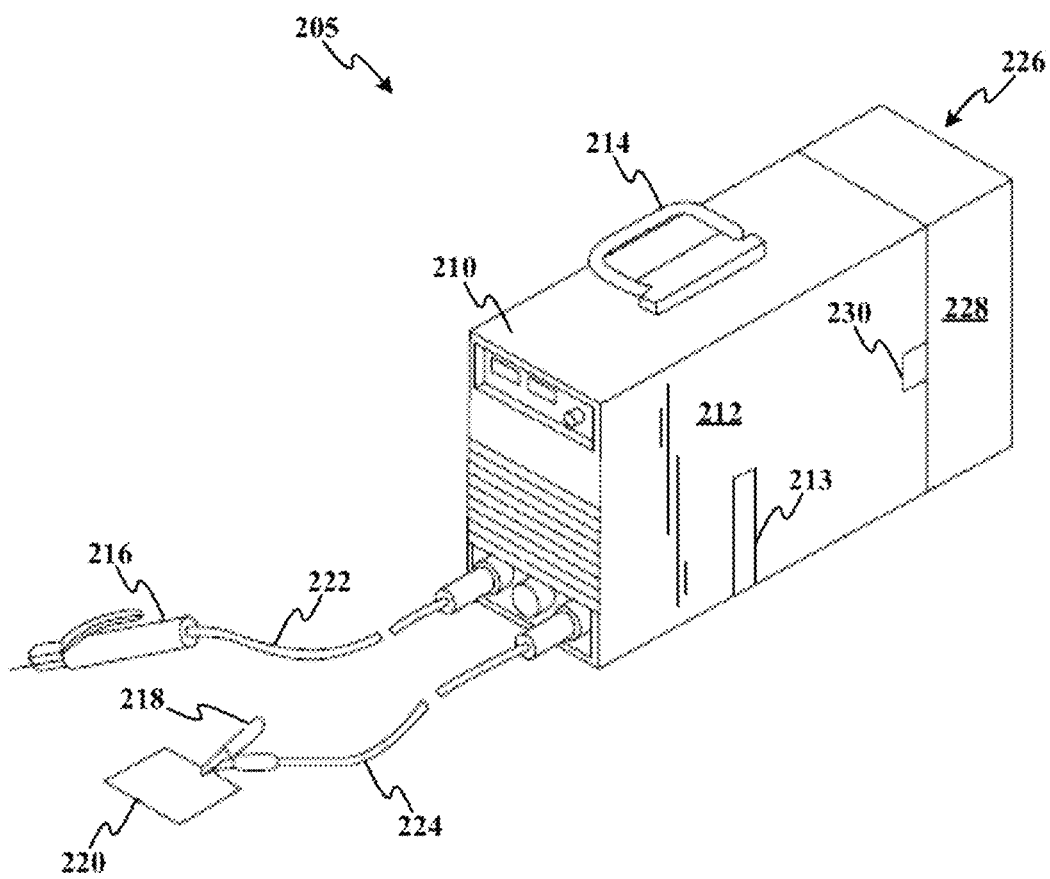
FIG. 2 illustrates an exemplary, non-limiting embodiment of welding equipment.

Referring now to FIG. 2, a perspective view of a welding device 200 that can be utilized with the subject innovation, wherein the welding device 200 is portable by way of being carried by a user. Welding device 200 includes a power source 210 that includes a housing 212 enclosing the internal components of power source 210. As will be described in greater detail below, housing 212 encloses control components 213. Optionally, welding device 200 includes a handle 214 for transporting the welding system from one location to another. To effectuate the welding process, welding device 200 includes a torch 216 as well as a grounding clamp 218. Grounding clamp 218 is configured to ground a workpiece 220 to be welded. As is known, when torch 216 is in relative proximity to workpiece 220, a welding arc or cutting arc, depending upon the particular welding-type device, is produced. Connecting torch 216 and grounding clamp 218 to housing 212 is a pair of cables 222 and 224, respectively.

The welding arc or cutting arc is generated by the power source 210 by conditioning raw power received from an interchangeable energy storage device 226. In a preferred embodiment, energy storage device 226 is a battery. Energy storage device 226 is interchangeable with similarly configured batteries. Specifically, energy storage device 226 is encased in a housing 228. Housing 228 is securable to the housing of welding device 200. Specifically, energy storage device 226 is secured to power source 210 by way of a fastening means 230. It is contemplated that fastening means 230 may include a clip, pins, male and female interlocking mechanism, screws, bolts, latches, locking tab, or other means to allow energy storage device 226 to be repeatedly secured and released from power source 210.

Figure 3:
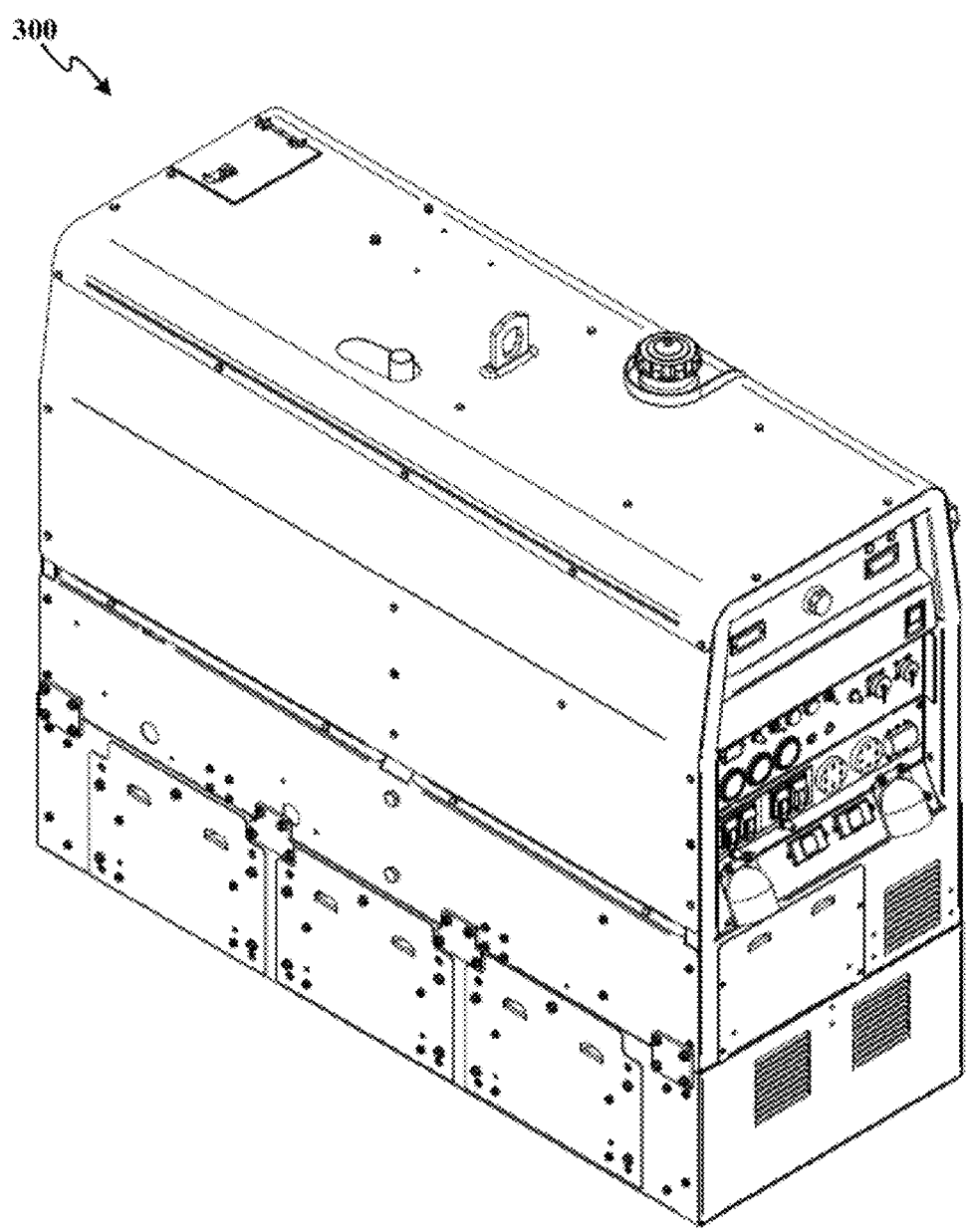
FIG. 3 illustrates an exemplary, non-limiting embodiment of welding equipment.
Figure 4:
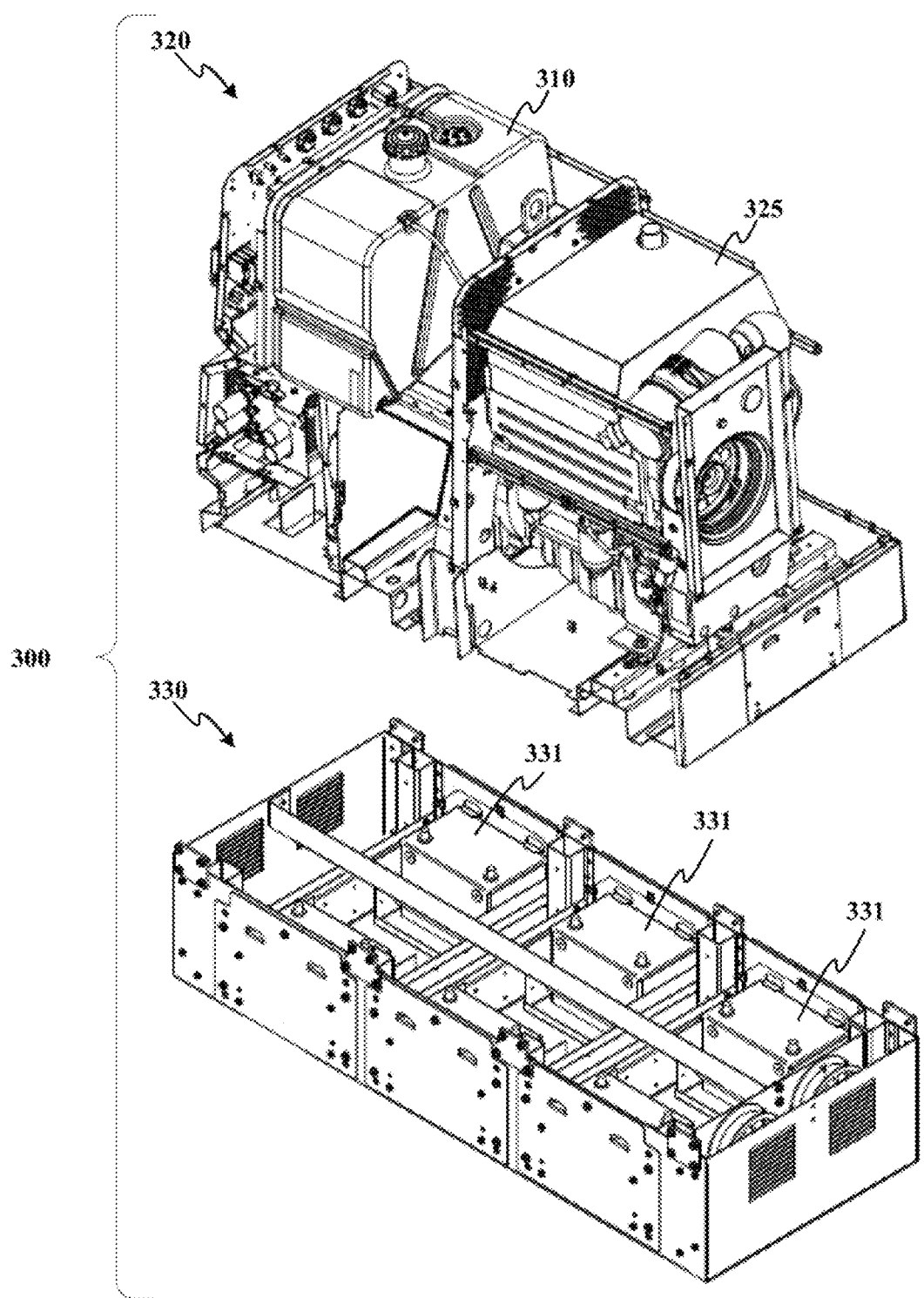
FIG. 4 illustrates an exemplary, non-limiting embodiment of welding equipment.

FIGS. 3 and 4 illustrate a welding device that includes hybrid functionality in which the power source includes an engine component and an energy storage device (herein referred to as a "hybrid welder"). A hybrid welder according to the subject innovation is generally indicated by the number 300 in the drawings. Hybrid welder 300 includes an engine component that runs on fuel from fuel storage 310 allowing the hybrid welder 300 to be portable. It will be appreciated that hybrid welder 300 may also be mounted in a permanent location depending on the application. Hybrid welder 300 generally includes a motor-driven welder assembly 320 having a motor 325 and an energy storage device 330. Motor 325 may be an internal combustion engine operating on any known fuel including but not limited to gasoline, diesel, ethanol, natural gas, compressed natural gas, hydrogen, and the like. These examples are not limiting as other motors, fuels, alternative fuels, and the like may be used.

For instance, the motor 325 or an engine can generate a voltage and such voltage can be stored in energy storage device 330. The controller and/or a switch component can automatically select between motor 325 and energy storage device 330 for a power source for the welding operation performed by the welding device. In an embodiment, the controller or the switch component can select between motor 325 and energy storage device 330 based upon a welding parameter.

For instance, the welding parameter can be, but is not limited to, a voltage of the welding operation, a current of the welding operation, a portion of a waveform used with the welding operation, a welding process, a wire type, a wire size, a wire feed speed (WFS), a volts, a current or voltage waveform used to perform the welding operation, a location of a current or voltage waveform being used to perform the waveform, a composition of the workpiece on which the welding operation is performed, sensor data (e.g., video camera, image capture, thermal imaging device, heat sensing camera, temperature sensor, among others), an amount of fuel available for motor, an amount of charge stored in energy storage device, a signal from a controller of the welding operation, a signal from a controller associated with welding device, a user identification, a user that is using the welding device, a trim, an arc control, a preflow, a run-in WFS, a crater time, a burnback time, a postflow time, and the like.

The motor 325 and energy storage device 330 may be operated individually or in tandem to provide electricity for the welding operation and any auxiliary operations performed by hybrid welder 300. For example, individual operation may include operating the motor 325 and supplementing the power from the motor 325 with power from the energy storage device 330 on an as needed basis. Or supplying power from the energy storage device 330 alone when the motor 325 is offline. Tandem operation may also include combining power from motor 325 and energy storage device 330 to obtain a desired power output. According to one aspect of the subject innovation, a welder 300 may be provided with a motor having less power output than ordinarily needed, and energy storage device 330 used to supplement the power output to raise it to the desired power output level. In an embodiment, a motor with no more than 19 kW (25 hp) output may be selected and supplemented with six 12 volt batteries. Other combinations of motor output may be used and supplemented with more or less power from energy storage device. The above example, therefore, is not limiting.

Energy storage device 330 may be any alternative power source including a secondary generator, kinetic energy recovery system, or, as shown, one or more batteries 331. In an embodiment, six 12 volt batteries 331 are wired in series to provide power in connection with motor-driven welder assembly 320. Batteries 331 shown are lead acid batteries. Other types of batteries may be used including but not limited to NiCd, molten salt, NiZn, NiMH, Li-ion, gel, dry cell, absorbed glass mat, and the like.

Figure 5:
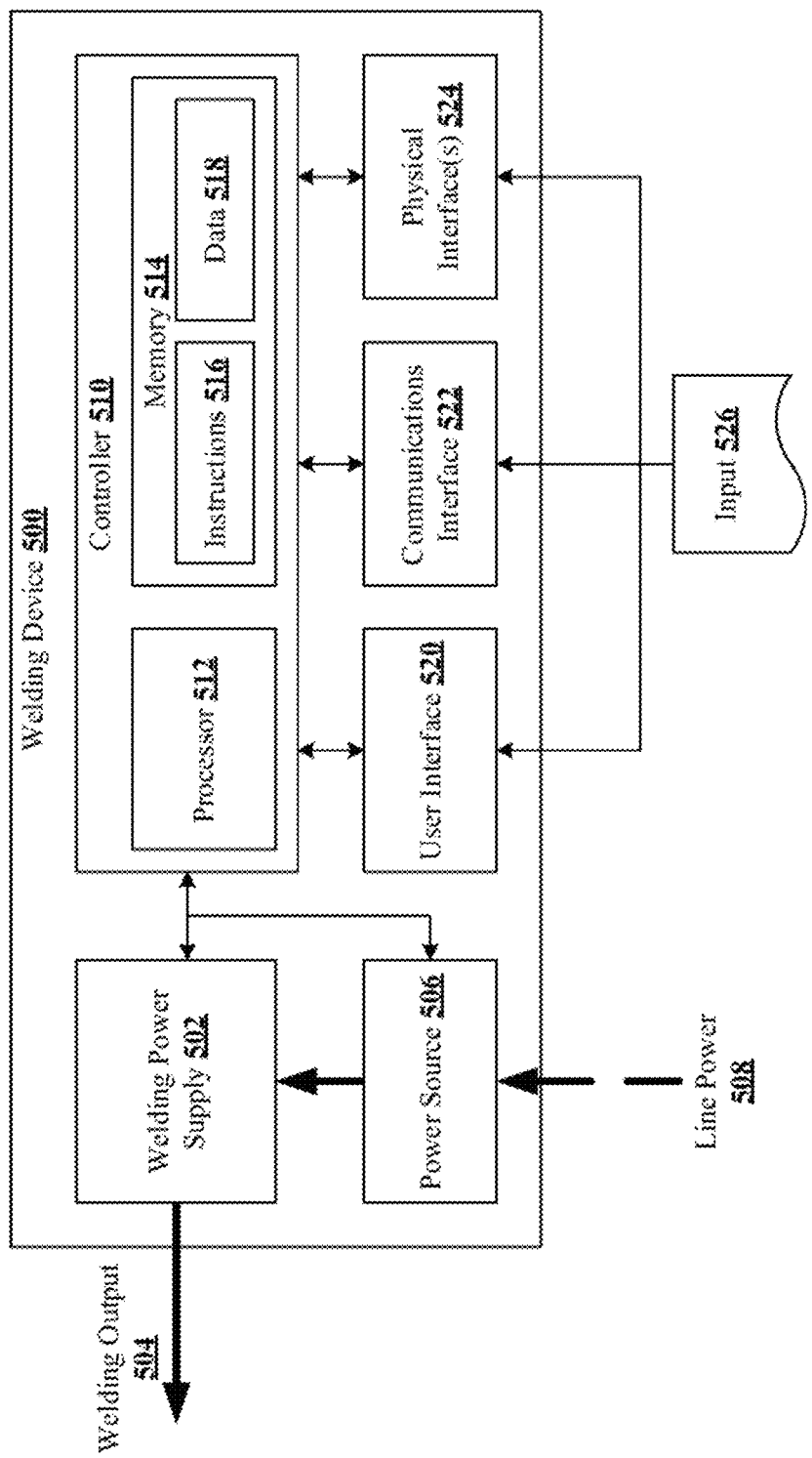
FIG. 5 is a block diagram of an exemplary, non-limiting embodiment of a welder that implements two-layer, dual purpose security in accordance with one or more aspects.

Turning to FIG. 5, illustrated is a block diagram of an exemplary, non-limiting embodiment of a welding device 500. Welding device 500 may be similar to the welding devices described above in connection with FIGS. 1-4. Welding device 500 implements multi-layer security having one or more security levels respectively associated with different functionality of the welding device 500. The one or more security levels may be hierarchically arranged such that access to a higher security level and the functionality associated therewith also provides access to lower security levels and the corresponding functionality. Each security level may require corresponding input that is verified before access is granted. Various forms of input are contemplated for use with welding device 500. For example, the input may be an alphanumeric code (e.g. a PIN code), a rotating security key, biometric input, user ID and password pair, a cryptographic certificate or other encrypted input, or the like. The input may involve authenticating an identity of a person seeking access to the welding device 500. For instance, a user ID may entered and the welding device 500 maintains an association between user IDs and respective security levels. If a correct password associated with the user ID is also entered, the welding device 500 enables access in accordance with the security level for the user ID. Still further, the input may be multi-factor.

As shown in FIG. 5, the welding device 500 includes a welding power supply 502 capable of converting an input power, which may be a three-phase input, into a welding output power. The welding output 504 is utilized to perform a welding operation. The welding power supply 502 may be an inverter-type power converter or a chopper-type power converter, for example. The input power may be provided to the welding power supply 502 by a power source 506. In one embodiment, power source 506 may receive line power 508 from an electrical grid and condition the line power 508 to provide the input power to the welding power supply 502. In other embodiments, welding device 500 is a portable device that can operate in the absence of grid power. In such embodiments, power source 506 may include an engine-driven generator to produce the input power to welding power supply 502 and/or a battery system to store power that can be output to the welding power supply 502.

The welding device 500 further includes a controller 510 configured to control operations of the welding device 500. Controller 510 includes a microcontroller or processor 512 configured to execute computer-executable instructions 516 stored on a non-transitory, computer-readable storage medium such as memory 514. The instructions 516 may be welding programs run by operators to perform welding operations. The instructions 516 may also include an operating system or other base programs used to set-up, configure, and/or diagnose the welding device 500. Memory 514 may also store data 518, which includes operational data, configured settings, welding parameters, or verification information against which security-related input is validated.

Welding device 500 can further include various interfaces such as user interface 520, communications interface 522, and physical interfaces 524 via which the welding device 500 may receive input 526. The user interface 520 may include a display or touchscreen and various buttons, switches, knobs, etc. by which information is output to a user and input is received. The communications interface 522 enables wireless (e.g. Bluetooth, WiFi, or cellular) or wired communication with external or remote devices. For example, a mobile device (e.g a smartphone) can be communicatively coupled to the welding device 500 to exchange display welding information, configure settings of the device 500, exchange security-related input, and to access and/or control various functions of the welding device 500. Thus, according to an embodiment, a mobile device may be utilized to interface with the welding device 500 via the communications interface 522 in a similar fashion to that which is enabled by the user interface 520. Physical interfaces 524 may include various ports or other input devices such as, but not limited to, USB ports, serial ports, or biometric input devices. For example, a USB storage device can be coupled to welding device 500 to transfer a security key or welding program. Biometric devices can be employed to capture biometric input from a user in addition to or in lieu of other security-related input (e.g. access codes).

The welding device 500 and, in particular, controller 510 can implement multi-level security where functionality of the welding device 500 is partitioned into one or more security levels. Each security level may be associated with different credentials or security-related input that is validated before the controller 510 activate functionality or enables access to features associated with that level. The security levels may be layered or stacked such that levels may be considered higher or lower than others. Access to a higher level provides access to a greater amount of functionality, which may include all functionality associated with lower levels in addition to new functionality. In one example, a first security level may be associated with operational features of the welding device 500. That is, access to the first security level is a prerequisite to start the welding device 500 and/or use the welding device 500 for a welding operations. A second security level may be associated with supervisory functions (e.g. configuration, set-up, etc.) and/or diagnostic functions of the welding device 500. Accordingly, an operator can use the welding device 500 on a job site to perform a welding operation, but set-up and maintenance features can remain restricted. Security levels and access codes can be modified via user interface 520 or by a remote interface (e.g. mobile device) communicating (via Bluetooth, cellular communications, WiFI, etc.) with the welding device 500 via the communications interface 522.

In accordance with an embodiment, the welding device 500 can include two security levels, each of which is respectively associated with an access code or PIN. A first access code or PIN is associated with a first security level and is for an operator of the welding device 500. The first security level is primarily to deter theft of the welding device 500. The first access code can be enabled so that any future user of the welding device 500 is required to enter the access code to operate the welding device 500. An owner of several devices, at a construction site for example, may elect to have all machines enabled with an identical access code. Accordingly, all operators can freely move between welding devices on the site. Alternatively, each operator may be assigned a different access code associated with a dedicated machine. The second security level enables the owner to access, monitor, and configure each machine via a second access code. The second access code not only enables access to welding functions, but also configuration and set-up features.

In another embodiment, the access code may be associated with a time delay. An operator enters the first access code and the machine remains activated until a certain amount of time passes. After the amount of time elapses, the access code may be needed to restart the machine. The time may be measured by an onboard clock of welding device 500 or by referencing an external clock, via communications interface 522, for example.

When a first security level is enabled, welding device 500 may not be operated and is otherwise disabled until entry of an access code or other input related to the first security level (or a higher level). For instance, controller 510 may disable power source 506 or welding power supply 502 until the access code is entered. If a time delay is also configured, the controller 510 keeps the power source 506 and welding power supply 502 operational until the predetermined duration of time elapses. Then, the controller 510 can disable the welding power supply 502 and/or the power source 506 until the access code is re-entered.

Figure 6:
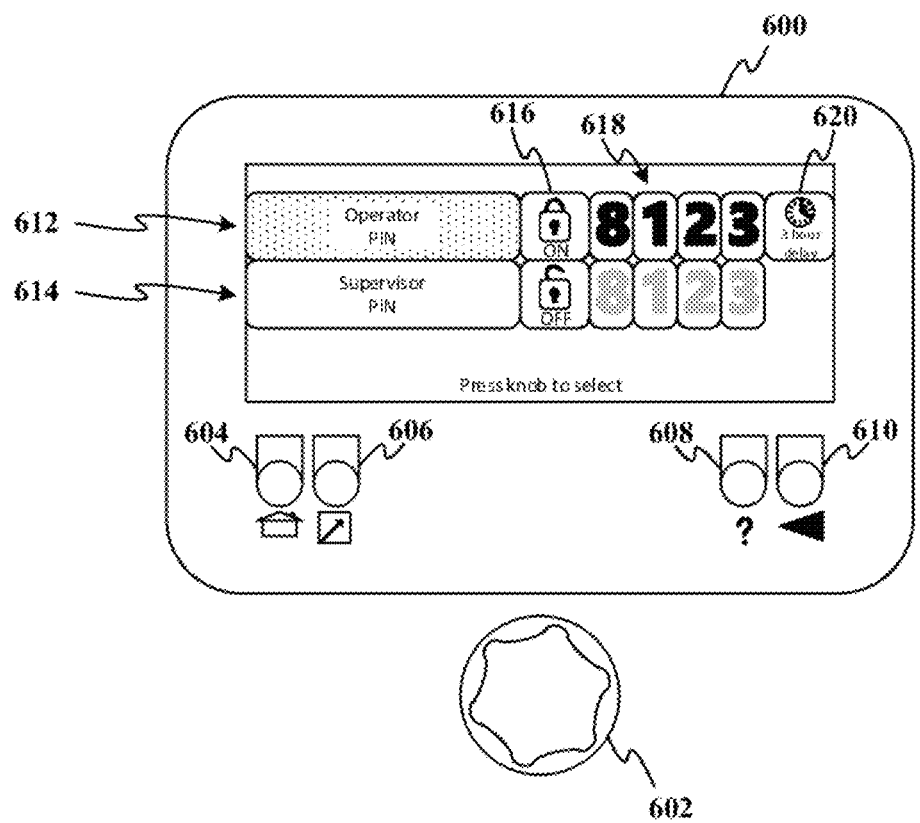
FIG. 6 illustrates an exemplary, non-limiting embodiment of a screen of a user interface of a welder according to various aspects.

Turning now to FIGS. 6-9, exemplary, non-limiting embodiments of a user interface of a welding device are illustrated. The user interface may include a display 600 and a knob 602. Each screen shown on display 600 may include soft keys 604, 606, 608, and 610 to enable navigation to a home screen, back one screen, etc. In FIG. 6, a PIN set-up screen is depicted. According to an embodiment, the welding device can activate two levels of security. One level is an operator level and is configured via a first row or operator row 612 of interface elements. The second level is a supervisor level that is configured via second row or supervisor row 614 of interface elements. Each of rows 612 and 614 can include a first interface element 616 that indicates whether or not that particular security level is activated. A series of second elements 618 indicate the configured access code and a third element 620 indicates a configured time delay.

The operator PIN is required to start the welding device. The time delay allows the operator to turn the machine off and on for a period of time without reentering the PIN. The time delay may be measured from a last time the PIN is entered. The supervisor PIN is required to enter set-up menus and engine service menus, for example. If a supervisor PIN is active, the supervisor PIN is entered before accessing to the screen in FIG. 6. If only the operator PIN is active, than entry of the operator PIN may grant access to the screen of FIG. 6. Disabled PINs may be shown in gray.

Figure 7:
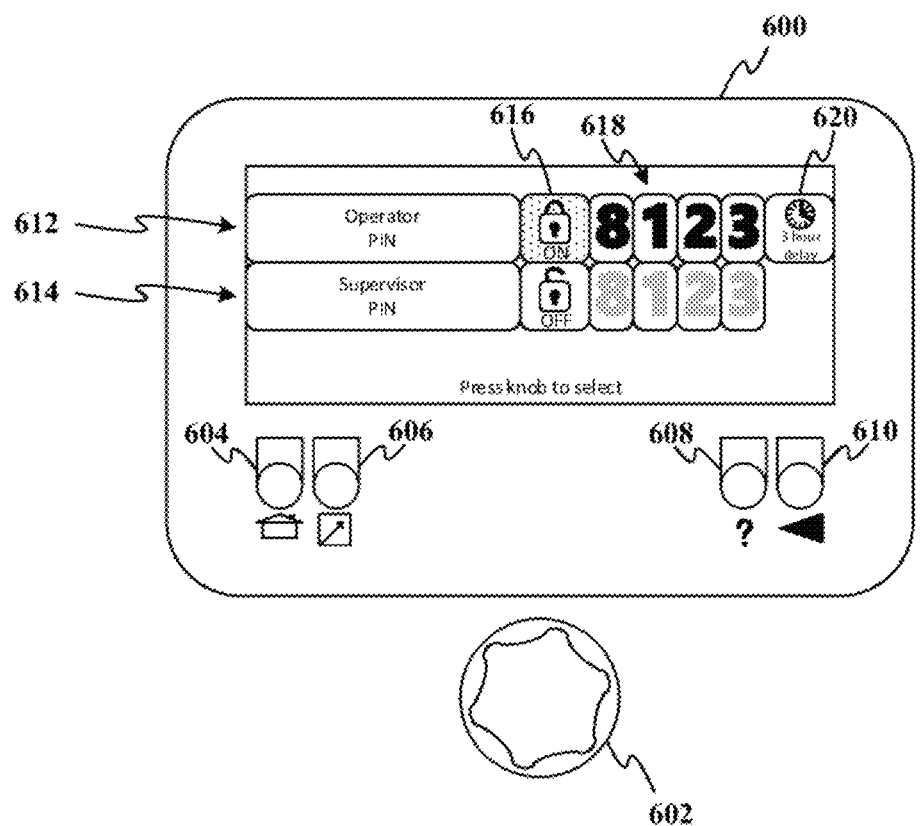
FIG. 7 illustrates an exemplary, non-limiting embodiment of a screen of a user interface of a welder according to various aspects.
Figure 8:
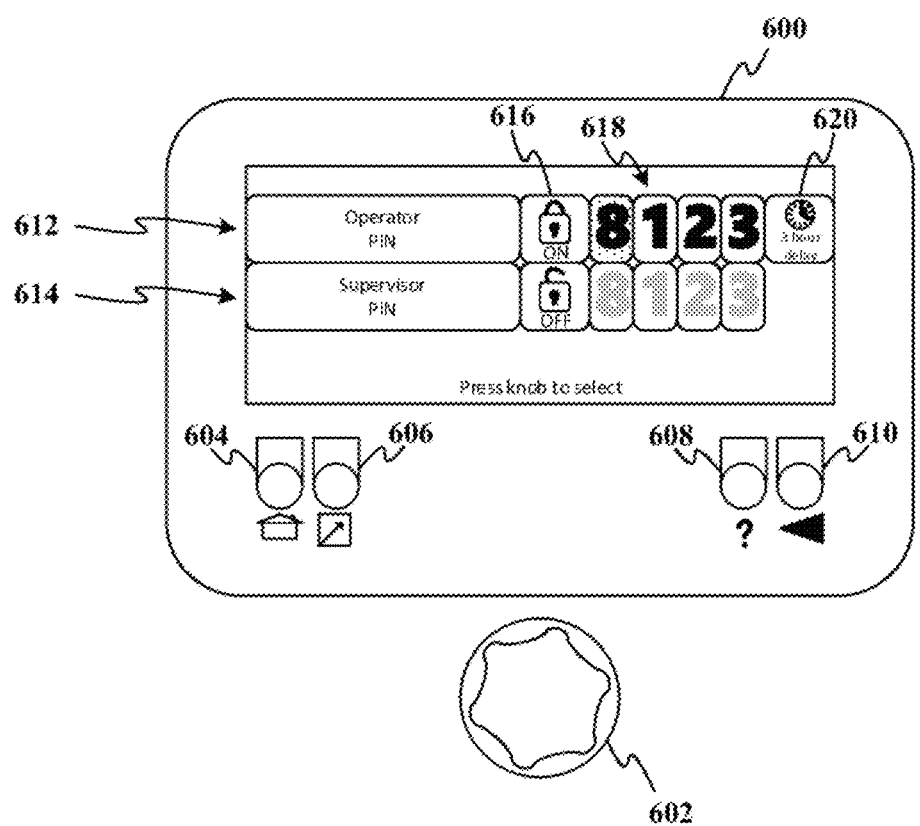
FIG. 8 illustrates an exemplary, non-limiting embodiment of a screen of a user interface of a welder according to various aspects.
Figure 9:
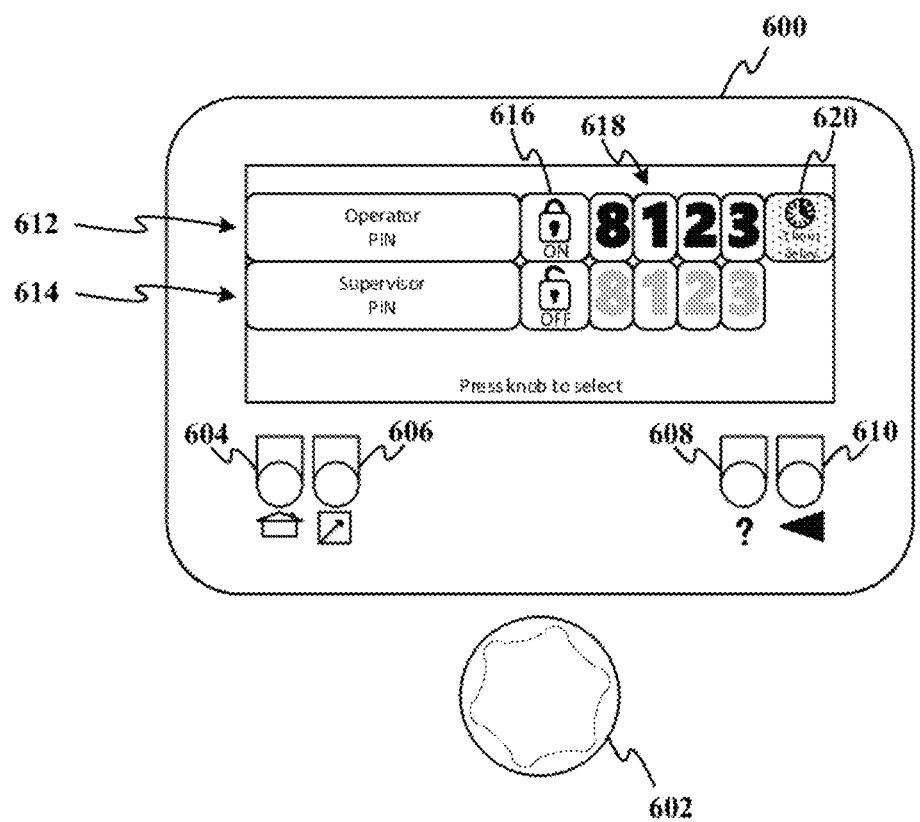
FIG. 9 illustrates an exemplary, non-limiting embodiment of a screen of a user interface of a welder according to various aspects.

Knob 602 can be rotated to highlight either the Operator PIN or Supervisor PIN and selection is made by pressing the knob 602. In FIG. 6, the Operator PIN is highlighted and pressing knob 602 transitions to user interface to FIG. 7. In FIG. 7, the first interface element 616 is highlighted. Here, knob 602 may be rotated to select either OFF or ON. If OFF is selected, the user interface returns to the screen of FIG. 6. If ON is selected, the user interface transitions to the screen of FIG. 8. In FIG. 8, the first digit of the PIN is highlighted. The knob 602 may be rotated to change the value of the digit. Pressing the knob 602 selects the displayed digit and moves to a next digit of the PIN. After the last number is selected, pressing the knob 602 advancing the user interface to the screen of FIG. 9. In FIG. 9, the time delay element is highlighted. Rotating the knob 602 changes the value of the time delay. In one example, the time delay may be changed to any time between 0 and 24 hours in half-hour increments. It is to be appreciated that other time increments (e.g. 5, 10, 15 minutes) may be utilized. Pressing the knob 602 after setting the time delay returns the user interface to the screen of FIG. 6.

Figure 10:
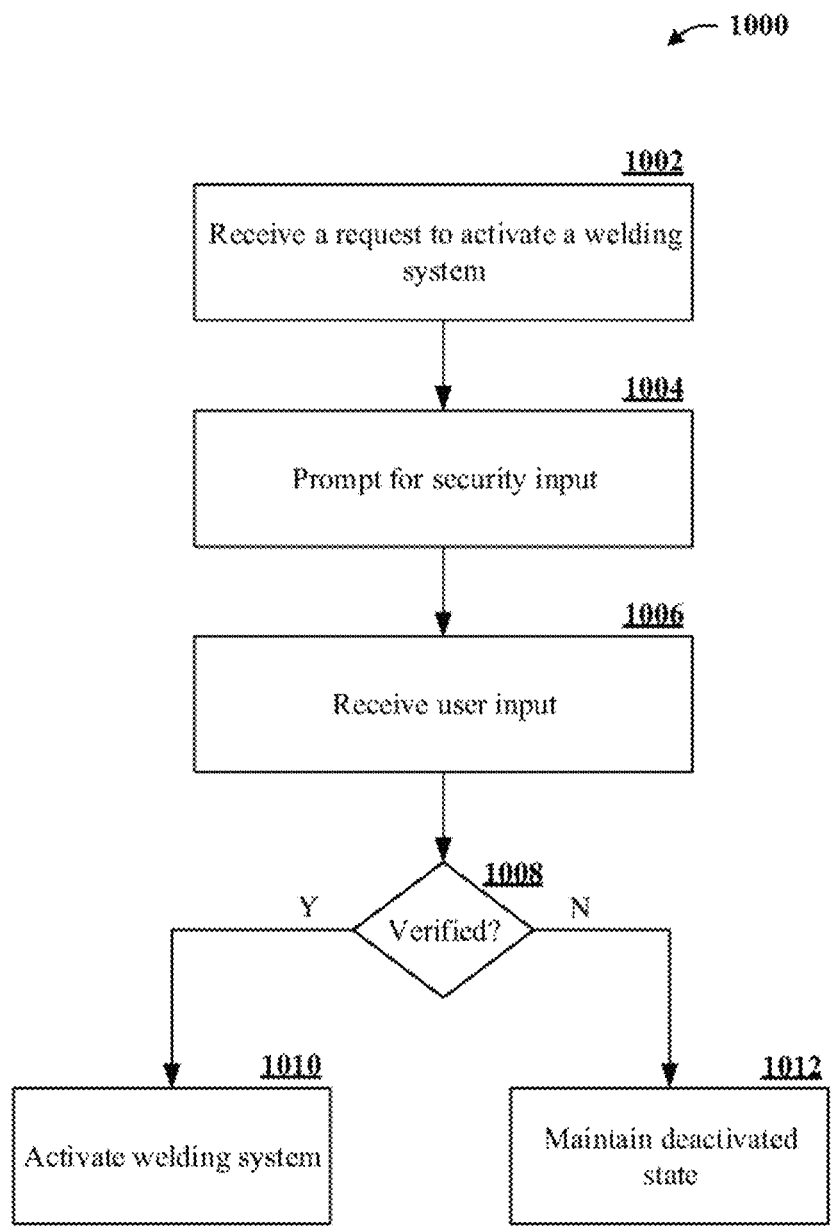
FIG. 10 is a flow diagram of an exemplary, non-limiting embodiment for a first layer security mechanism in accordance with one or more aspects.
Figure 11:
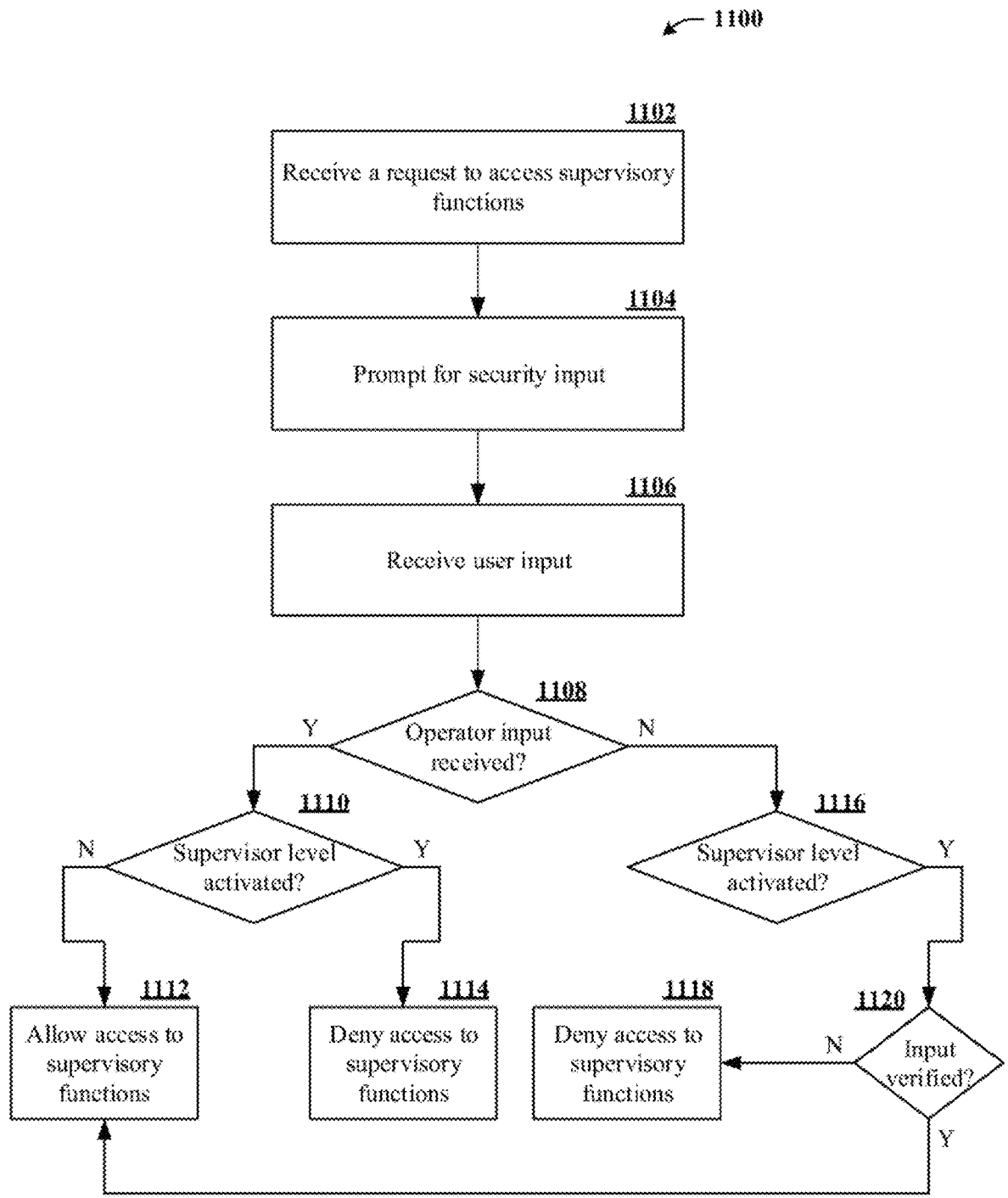
FIG. 11 is a flow diagram of an exemplary, non-limiting embodiment for a second layer security mechanism in accordance with one or more aspects.

Turning now to FIGS. 10 and 11, various methodologies are described in connection with the illustrated flow charts. The methodologies described can be performed by a controller (e.g. controller 510) of a welding device (e.g. welding device 500) to implement multi-level security. Referring initially to FIG. 10, illustrated is a flow chart of a method 1000 for controlling access to a welding system in accordance with a first layer of security. At 1002, a request to activate a welding system is received. At 1004, an operator is prompted, via a user interface for example, for security input (e.g. an access code). At 1006, user input (e.g. the access code) is received. At 1008, the user input is verified. If the input is valid, method 1000 transitions to 1010 where the welding system is activated. If the input is invalid, the method 1000 transitions to 1012 where the welding system is maintained in a deactivated state.

FIG. 11 illustrates a flow chart of a method 1100 for controlling access to a welding system in accordance with at least two layers of security. At 1102, a request to access supervisory functions is received. At 1104, a user is prompted, via a user interface for example, for security input (e.g. an access code). At 1106, user input (e.g. the access code) is received. At 1108, it is determined where the access code input is an operator access code. If yes, method 1100 transitions to 1110 where a determination is made as to whether or not a supervisor security level is activated. If yes, the method 1100 moves to reference numeral 1114 where access is denied to the supervisory functions. If a supervisor security level is not activated, as determined at 1110, the method 1100 moves to 1112 where access to the supervisory functions is granted. Returning to a second branch from the decision at 1108, if the input is not associated with an operator (e.g. not a operator access code), the method 1100 moves to reference numeral 1116 where it is determined whether the supervisor level is activated. If the supervisor level is active, the method moves to 1120 where the input is validated against a configured supervisor access code. If the input is valid, access is granted at 1114. If the input is invalid, access is denied to the supervisory functions.

In accordance with the foregoing, in one embodiment, a welding device is provided that includes a welding power supply configured to generate a welding output to an electrode to perform a welding operation. The welding device further includes a power source configured to provide power to the welding power supply for conversion into the welding output. The welding device can also include an interface configured to receive a security-related input and a controller. The controller can be configured to verify the security-related input based on an associated request for access to a function and configured security levels of the welding device, and selectively enable access to the function in accordance with a verification result.

In one example, the configured security levels include an operator level and a supervisor level. The operator level secures operator access to the welding device and the supervisor level secures management access to the welding device. Input valid for the operator level does not enable management access to the welding device when both the operator level and supervisor level are configured.

The controller is further configured to disable at least one of the welding power supply or the power source until valid security-related input is received when at least one security level is configured. The security-related input is an alphanumeric code. The controller is configured to accept either an operator code or a supervisor code to enable the welding device to perform the welding operation. The supervisor code enables access to functions to configure the welding device.

In other example, the function is a welding function enabling performance of the welding operation and the controller is further configured to keep the welding function enabled for a configured amount of time. The controller is further configured to disable the welding function after the configured amount of time, prompt for the security-related input, and re-enable the welding function upon successful verification of the security-related input.

According to another aspect, a method is provided for a welding device having at least two security levels, wherein a first security level is associated with a first set of functionality and a second security level is associated with a second set of functionality. The method includes receiving a request to access a function of the welding device. The method further includes prompting for entry of security-related input and receiving a user input. The method also includes determining whether the function requested corresponds to the first security level or the second security level. The method further includes verifying the user input against a determined security level associated with the function requested. The method can include enabling access to the function when the user input is valid for the determined security level.

In an example, the first set of functionality is a subset of the second set of functionality. The first set of functionality includes functions related to using the welding device for welding operations. The second set of functionality includes management and configuration functions. The method can also include maintaining enablement of the function for a predetermined duration of time after the user input is validated and prompting for re-entry of the security-related input after the predetermined duration of time elapses. Further, the method includes disabling operation of the welding device until receiving valid security-related input. In some examples, the user input is an alphanumeric code.

In yet another aspect, a non-transitory, computer-readable storage medium is described having stored thereon computer-executable instructions implementing security procedures for a welding device. The instructions, when executed, configure a processor to disable operation of the welding device pending entry and validation of security-related input; receive user input indicative of a function request and an access code, wherein the access code corresponds to at least one security level of one or more configured security levels of the welding device; verify the access code based on the at least one security level corresponding to the access code and an association of respective functions of the welding device to respective security levels; and enable operation of the welding device when the access code corresponds to a security level associated with the function requested. In addition, instructions can be stored that also configure the processor to disable operation of the welding device after a predetermined duration of time.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed subject innovations. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject innovation.

The above examples are merely illustrative of several possible embodiments of various aspects of the present subject innovation, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the subject innovation. In addition although a particular feature of the subject innovation may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the subject innovation, including the best mode, and also to enable one of ordinary skill in the art to practice the subject innovation, including making and using any devices or systems and performing any incorporated methods. The patentable scope of the subject innovation is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the subject innovation has been described for purposes of illustrating the best mode known to the applicant at the time. The examples are illustrative only and not meant to limit the subject innovation, as measured by the scope and merit of the claims. The subject innovation has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof

What is claimed is:

1. A welding device, comprising:
   a welding power supply configured to generate a welding output to an electrode to perform a welding operation;
   a power source configured to provide power to the welding power supply for conversion into the welding output;
   interface means configured to receive a security-related input data as at least one of an alpha-numeric data input by a user or a biometric data input captured from the user; and
   controller means configured to:
      verify the security-related input data as being valid for a security level configured within the controller means of the welding device; and
      enable access to one of a welding function, to enable performance of the welding operation, or a management function, to enable performance of a supervisory management operation, in response to the security-related input data being verified as valid,
      wherein the controller means is further configured to keep access to the welding function enabled for a configured amount of time, even when the welding device is turned off and on during the configured amount of time.

2. The welding device of claim 1, wherein the security level corresponds to one of an operator security level, configured to allow the user to access and perform the welding operation, or a supervisor security level, configured to allow the user to access and perform the supervisory management operation.

3. The welding device of claim 2, wherein the operator security level is for providing access to the welding device by the user when the user is an operator user, and the supervisor security level is for providing access to the welding device by the user when the user is a management user.

4. The welding device of claim 1, wherein the controller means is further configured to disable at least one of the welding power supply or the power source until the security-related input data is verified as being valid.

5. The welding device of claim 3, wherein the management function allows the management user to configure the welding device as part of the supervisory management operation.

6. The welding device of claim 1, wherein the controller means is further configured to:
   disable access to the welding function after the configured amount of time;
   prompt the user for the security-related input data; and
   re-enable access to the welding function upon successful verification of the security-related input data as being valid.

7. A method for a welding device having at least two security levels, wherein a first security level is associated with a first set of functionality of the welding device and a second security level is associated with a second set of functionality of the welding device, the method comprising:
   receiving a request to access a function of the welding device;
   prompting for entry of a security-related input data;
   receiving a user input as the security-related input data;
   determining whether the function requested corresponds to the first security level or the second security level;
   verifying the user input as being valid for a determined security level associated with the function requested;
   enabling access to the function requested when the user input is verified as being valid for the determined security level; and
   keeping access to the function requested enabled for a predetermined duration of time after the user input is verified as being valid, even when the welding device is turned off and on during the predetermined duration of time.

8. The method of claim 7, wherein the first set of functionality is a subset of the second set of functionality.

9. The method of claim 7, wherein the user input is an alphanumeric code.

10. The method of claim 7, wherein the first set of functionality includes functions related to using the welding device for welding operations.

11. The method of claim 7, wherein the second set of functionality includes management and configuration functions.

12. The method of claim 7, further comprising prompting for re-entry of the security-related input data after the predetermined duration of time elapses.

13. The method of claim 7, further comprising maintaining the welding device in a disabled state of operation until the user input is verified as being valid for the determined security level.

14. A non-transitory, computer-readable storage medium having stored thereon computer executable instructions implementing security procedures for a welding device, the instructions, when executed, configure a processor to:

disable operation of the welding device pending entry and validation of security-related input data;

receive user input data as the security-related input data being indicative of a function request and an access code, wherein the access code corresponds to at least one security level of one or more configured security levels of the welding device;

verify the access code as being valid for the at least one security level;

enable operation of the function requested of the welding device when the access code is verified and when the function requested corresponds to the at least one security level, and keep access, to the function requested, enabled for a predetermined duration of time, even when the welding device is turned off and on during the predetermined duration of time.

15. The non-transitory, computer-readable storage medium of claim 14, wherein the instructions further configure the processor to disable operation of the welding device after the predetermined duration of time.

* * * * *